No. 791,369. PATENTED MAY 30, 1905.
A. B. RICHARDS & G. W. GERLACH.
ONION DIGGER.
APPLICATION FILED JAN. 9, 1905.
Fig. I.
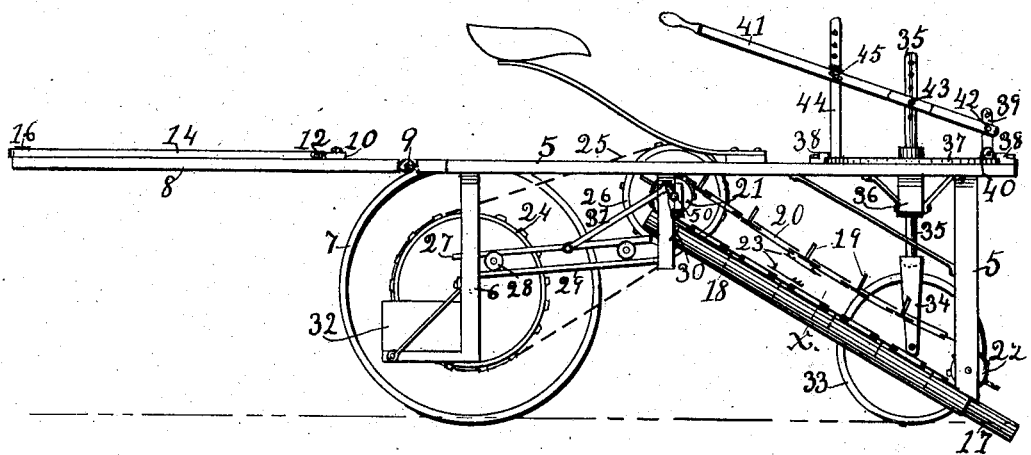
Fig. II.
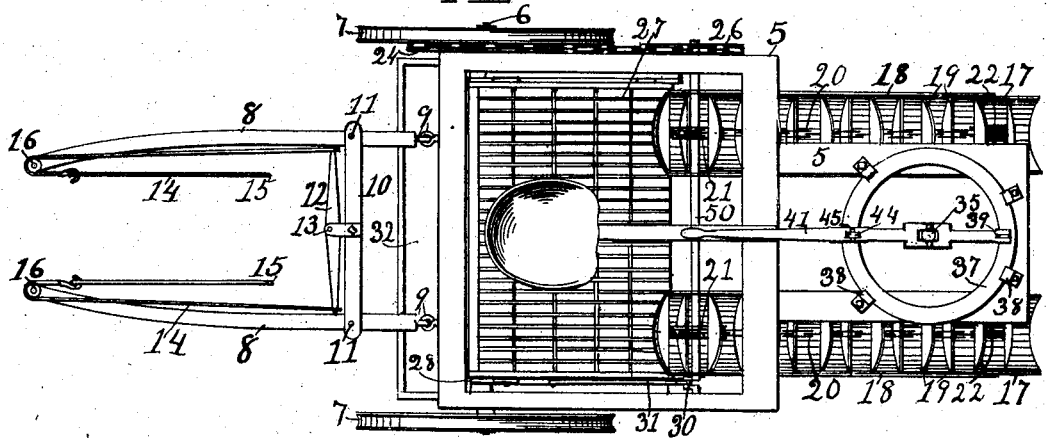
Fig. III.
Witnesses
N. P. Waller
A. E. Waller
Inventors
Adam B. Richards
George W. Gerlach
by W. C. Stevens, Attorney No. 791,369. Patented May 30, 1905.

UNITED STATES PATENT OFFICE.

ADAM B. RICHARDS AND GEORGE W. GERLACH, OF LOUISVILLE, KENTUCKY.

ONION-DIGGER.

SPECIFICATION forming part of Letters Patent No. 791,369, dated May 30, 1905.

Application filed January 9, 1905. Serial No. 240,147.

*To all whom it may concern:*

Be it known that we, ADAM B. RICHARDS and GEORGE W. GERLACH, citizens of the United States, residing at Louisville, in the county of Jefferson and State of Kentucky, have invented new and useful Improvements in Onion-Diggers, of which the following is a specification.

This invention relates to that class of digging-machines which are used to gather and separate from the clinging dirt vegetables, like onion-sets, potatoes &c., which are grown in rows; and its object is, first, to prevent the vegetables from being trodden upon by the horse in propelling the machine; second, to enable the operator while riding on the machine to direct it so that it will gather the vegetables from their rows, and, third, to separate the vegetables from the dirt and to deposit them in a suitable receptacle carried on the machine.

To this end our invention consists in the construction and combination of parts forming an onion-digger, hereinafter more fully described, and particularly set forth in the claims, reference being had to the accompanying drawings, in which—

Figure I represents our onion-digger in side view without the near wheel. Fig. II shows a top view of the same. Fig. III is a cross-sectional view at the line $x$ of one of the elevators.

Numeral 5 represents the frame having an axle 6, on which two drive-wheels 7 are journaled to roll on the ground.

8 represents thills, each of which is attached to the rear end of the frame by a hinge, such as two eyebolts 9, connected together, forming a joint which is flexible both vertically and horizontally.

10 is a cross-bar to the thills; but its connection therewith is by means of hinge pins or bolts 11 passing through both the cross-bar and the adjacent thill. By this means the thills are joined firmly enough to keep them parallel and prevent their being warped much out of plane in service; yet they are free to swing sidewise to accommodate the necessary movements of the horse.

12 represents a swingletree pivoted at 13 midway upon the cross-bar 10, and 14 represents traces which are connected with the harness of the horse, as usual, in the region of the ends 15. Thence they extend backward around the pulleys 16, which are mounted in the ends of the thills, and thence forward to the swingletree 12, to which they may be connected in any usual manner.

17 is a scoop-shaped plow hung from the frame 5 at the forward end of the trough 18, which trough is fixed in a position slanting up from the ground and rearward from the plow.

19 represents elevator scoops or carriers, mounted upon a chain 20, which travels around sprocket-wheels 21 22 in the direction of the arrows 23 to carry up the trough 18 whatever is dug from the ground and delivered thereto by the shovels 17.

24 is a sprocket-wheel secured to the drive-wheel 7 to revolve therewith and connected by a chain 25 with a sprocket-wheel 26, which is fixed on the driven shaft 50 of the sprocket-wheel 21 to revolve the latter, and with it the elevator-chain 20, by the action of the drive-wheel 7 as it rolls in advancing along the ground.

27 is a screen made of wire or other suitable material to separate the vegetables from the dirt. This screen is located with one end under the upper end of the elevator to receive therefrom whatever is delivered, and it is mounted on wheels 28, which roll on side tracks 29.

30 is a crank upon the drive-shaft 50, connected by a rod 31 with the screen 27, whereby the revolving of the wheel 26 communicates a longitudinally-shaking motion to the screen. The screen has a rearward inclination, and its shaking tends to work the vegetables down the incline to its rear end, where they drop into a receptacle 32, which is carried on the machine while the dirt is loosened from the vegetables and falls through the screen to the ground.

33 is a guide-wheel mounted in a fork 34, which has a stem 35 passing up through a vertical socket 36, which is a fixture of the frame 5.

37 is what is termed in vehicle construction a "fifth-wheel." It is mounted on the frame 5 to rotate in a horizontal plane under the flange-clips 38.

39 is a post pivoted between ears 40 to the fifth-wheel.

41 is the guiding-lever pivoted at 42 to the post 39 and connected with the guide-wheel stem by means of a strong pivot-pin 43, so that the stem 35 and the lever 41 may be freely moved up and down; but the said stem cannot revolve in its socket 36 unless it is turned by the lever, and the lever in so doing rotates the fifth-wheel 37.

44 is a post fixed upon the fifth-wheel and provided with a series of pin-holes to be engaged by a pin 45, which passes through the lever 41, whereby the lever may be retained at any point vertically after the guide-wheel 33 has been set at the required level to permit the plows 17 to dig as deeply as desired into the ground. At the same time the fifth-wheel 37 and guide-wheel 33 may be freely turned from side to side by means of the lever 41 to guide the machine, so that the plows shall follow the rows of vegetables to be dug.

46 represents a seat for the operator.

There is one plow and one elevator to each row of vegetables to be dug, and there may be as many of the plows and elevators on one machine as it is found practicable to use; but, as shown in Fig. II, two plows and elevators are thought to be the best adapted for general use. In any case one screen will serve for any number of plows and elevators.

The horse travels behind the machine, pushing it ahead of him, and the vegetables being gathered before he comes along cannot be trodden upon by him. While the thill construction is so stiff that the horse may thereby push the machine in any direction in which it may be guided by the operator, yet it is vertically and horizontally free to swing upon its hinge connections, so as to render the natural movements of the horse free and easy. If the ground is uneven, the operator may leave the pin 45 out, so that he can raise or lower the lever at will, thereby controlling the depth of plowing, as required.

While we have called this machine an "onion-digger," it may be adapted to digging and cleaning potatoes and other vegetables which are grown in rows.

Having thus fully described our invention, what we believe to be new, and desire to secure by Letters Patent, is the following:

1. In onion-diggers, a frame and a pair of wheels journaled on the axle thereof; one or more plows hung upon the frame forward of the drive-wheels; elevating mechanism connected with the drive-wheels; a guide-wheel located forward of the drive-wheels and connected with the frame by joints which permit horizontal rotary movement and vertical sliding movement, and a hand-lever connected with the wheel-mountings substantially as described whereby the wheel may be guided and the frame with the plows attached may be raised or lowered at will.

2. In onion-diggers, a frame; a pair of drive-wheels thereon; one or more plows hung to the frame; a guide-wheel journaled in a fork which is provided with a stem; a vertical socket of the frame carrying the said stem; a fifth-wheel mounted horizontally upon the frame; a post pivoted upon the fifth-wheel; a guiding-lever pivoted to the said post and to the said stem; another post provided with a series of pin-holes and fixed upon the fifth-wheel, and a pin to engage the said guide-lever and the last-named post, substantially as shown and described.

ADAM B. RICHARDS.
GEORGE W. GERLACH.

Witnesses:
MICHAEL LYONS,
D. H. STIEBEL.